(12) United States Patent
Suzuki

(10) Patent No.: US 9,932,051 B2
(45) Date of Patent: Apr. 3, 2018

(54) BRAKE APPARATUS

(71) Applicant: KYB Corporation, Tokyo (JP)

(72) Inventor: Tsutomu Suzuki, Kanagawa (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 15/126,309

(22) PCT Filed: Jul. 8, 2015

(86) PCT No.: PCT/JP2015/069652
§ 371 (c)(1),
(2) Date: Sep. 15, 2016

(87) PCT Pub. No.: WO2016/027582
PCT Pub. Date: Feb. 25, 2016

(65) Prior Publication Data
US 2017/0106882 A1    Apr. 20, 2017

(30) Foreign Application Priority Data

Aug. 18, 2014 (JP) .................................. 2014-166035

(51) Int. Cl.
| F16D 55/22 | (2006.01) |
| B61H 5/00 | (2006.01) |
| F16D 55/2255 | (2006.01) |
| F16D 65/18 | (2006.01) |
| F16D 125/68 | (2012.01) |

(52) U.S. Cl.
CPC ........... B61H 5/00 (2013.01); F16D 55/2255 (2013.01); F16D 65/18 (2013.01); *F16D 2125/68* (2013.01)

(58) Field of Classification Search
CPC ... B61H 5/00; F16D 55/2255; F16D 55/2245; F16D 2125/68; F16D 2125/28; F16D 65/18
USPC ......................................... 188/72.7, 72.9, 76
See application file for complete search history.

(56) References Cited

U.S. PATENT DOCUMENTS

| 2,348,078 | A | * | 5/1944 | Ledwinka ................ B61H 5/00 188/107 |
| 3,489,022 | A | * | 1/1970 | Krahl ...................... B61H 5/00 188/59 |
| 3,722,636 | A | * | 3/1973 | Kobelt ................ F16D 55/2245 188/170 |

(Continued)

FOREIGN PATENT DOCUMENTS

| JP | H10-505038 A | 5/1998 |
| KR | 100707820 B1 | 4/2007 |
| WO | WO 2008-123430 A1 | 10/2008 |

*Primary Examiner* — Thomas W Irvin
(74) *Attorney, Agent, or Firm* — Rabin & Berdo, P.C.

(57) ABSTRACT

A brake apparatus includes a first coupling member coupled to one end part of one of a pair of link arms, a second coupling member coupled to the one end part of the other of the pair of link arms to freely advance and retract with respect to the first coupling member, an actuator configured to advance and retract an output member, a lever rotatably coupled to the output member and configured to be rotated by advancing and retracting movements of the output member and a booster unit configured to advance and retract the second coupling member with respect to the first coupling member by boosting a force transmitted by the rotation of the lever.

8 Claims, 6 Drawing Sheets

(56) References Cited

U.S. PATENT DOCUMENTS

| | | | | |
|---|---|---|---|---|
| 4,236,608 A * | 12/1980 | Kobelt | ............... | B61H 7/12 |
| | | | | 188/43 |
| 4,308,937 A * | 1/1982 | Johnson | ............... | B61H 7/12 |
| | | | | 104/17.1 |
| 4,592,451 A * | 6/1986 | Persson | ............... | B61H 5/00 |
| | | | | 188/107 |
| 5,813,499 A * | 9/1998 | Staltmeir | ............... | B61H 5/00 |
| | | | | 188/59 |
| 6,722,477 B1 * | 4/2004 | Wolfsteiner | ............... | B61H 5/00 |
| | | | | 188/173 |
| 8,006,816 B2 * | 8/2011 | Kraus | ............... | B60T 17/083 |
| | | | | 188/170 |
| 8,757,330 B2 * | 6/2014 | Sato | ............... | B61H 5/00 |
| | | | | 188/106 F |
| 8,763,765 B2 * | 7/2014 | Ebner | ............... | F16D 55/2245 |
| | | | | 188/196 V |
| 8,763,766 B2 * | 7/2014 | Ebner | ............... | F16D 55/2245 |
| | | | | 188/196 D |
| 8,794,393 B2 * | 8/2014 | Argirovski | ............... | F16D 55/2245 |
| | | | | 188/196 D |
| 9,127,735 B2 * | 9/2015 | Putz | ............... | F16D 65/18 |
| 9,371,078 B2 * | 6/2016 | Tsurusaki | ............... | B61H 5/00 |
| 9,522,684 B2 * | 12/2016 | Kimura | ............... | F16D 55/2255 |
| 9,586,646 B2 * | 3/2017 | Nakakura | ............... | B62L 1/14 |
| 2010/0044165 A1 * | 2/2010 | Argirovski | ............... | F16D 55/2245 |
| | | | | 188/71.8 |
| 2010/0294601 A1 * | 11/2010 | Kraus | ............... | B60T 17/083 |
| | | | | 188/72.2 |
| 2016/0264158 A1 * | 9/2016 | Suzuki | ............... | B61H 5/00 |
| 2017/0080958 A1 * | 3/2017 | Suzuki | ............... | B61H 5/00 |

* cited by examiner

FIG.5

BRAKE APPARATUS

TECHNICAL FIELD

The present invention relates to a brake apparatus.

BACKGROUND ART

Conventionally, a brake apparatus has been used which brakes the rotation of a wheel by causing a force by an actuator to act on points of force of a pair of link arms rotatable about fulcrums and causing brake linings supported on points of action of the link arms to slide in contact with brake discs.

JP10-505038A discloses a brake caliper unit in which one end parts of caliper levers are coupled to each other, the other end parts are respectively rotationally mounted on brake pads and an eccentric body transmission device provided on a fulcrum between the both end parts of the caliper levers rotates the caliper levers. The eccentric body transmission device includes an eccentric pin configured to rotate by receiving a force by a braking force generator and rotates the caliper levers about the one end parts by the rotation of this eccentric pin.

SUMMARY OF INVENTION

However, in the caliper brake unit of JP10-505038A, circumferential tangential forces acting on the brake pads from the brake discs during braking in which the brake pads slide in contact with the brake discs act on the eccentric pin of the eccentric body transmission device. Thus, a large force is necessary to rotate the eccentric pin during braking and it has been difficult to improve mechanical efficiency.

The present invention aims to improve the mechanical efficiency of a brake apparatus.

According to one aspect of the present invention, a brake apparatus for braking by sandwiching brake discs rotating together with a wheel, includes a brake main body supported on a vehicle body or a truck; a pair of link arms having supporting portions between one and other end parts rotatably supported on the brake main body, the pair of link arms being respectively provided to face both surfaces of the brake discs and configured such that the other end parts support brake linings for giving a frictional force by sliding in contact with the brake discs; a first coupling member coupled to the one end part of one of the pair of link arms; a second coupling member coupled to the one end part of the other of the pair of link arms to freely advance and retract with respect to the first coupling member; an actuator configured to advance and retract an output member; a lever rotatably coupled to the output member of the actuator and configured to be rotated by advancing and retracting movements of the output member; and a booster unit configured to advance and retract the second coupling member with respect to the first coupling member by boosting a force transmitted by the rotation of the lever.

BRIEF DESCRIPTION OF DRAWINGS

FIG. 5 is a plan view of a brake apparatus according to a second embodiment of the present invention.

DESCRIPTION OF EMBODIMENT

Figure 1:
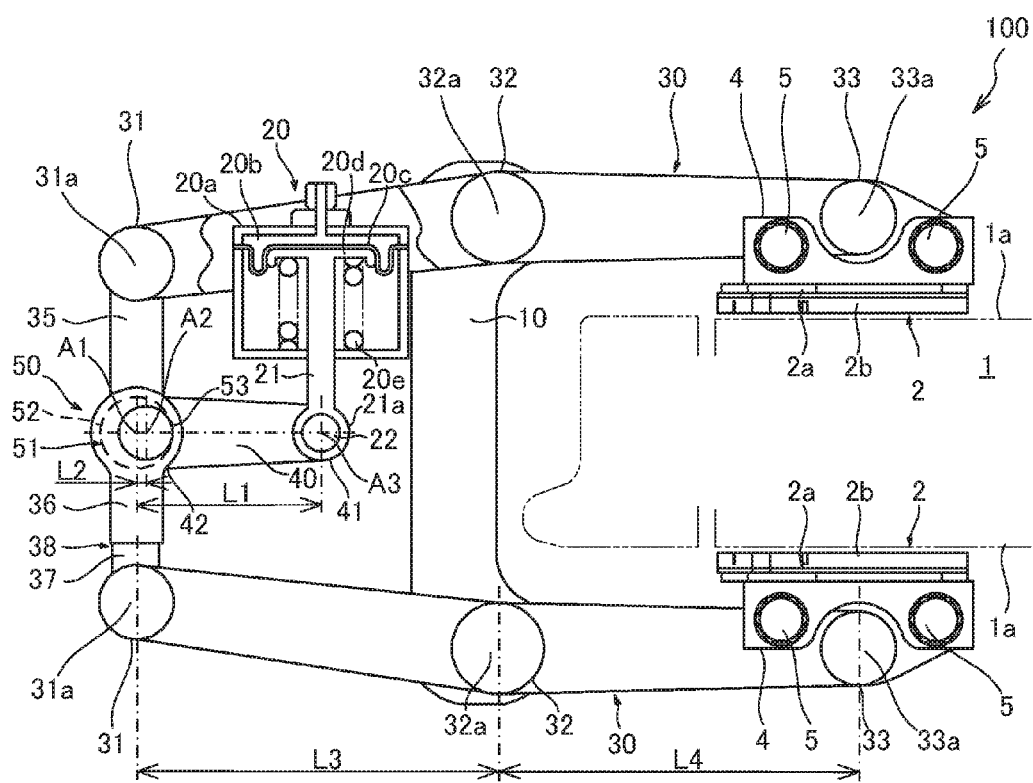
FIG. 1 is a plan view of a brake apparatus according to a first embodiment of the present invention.

Hereinafter, embodiments of the present invention are described with reference to the drawings.

First Embodiment

First, the configuration of a brake apparatus 100 according to a first embodiment of the present invention is described with reference to FIGS. 1 to 4.

The brake apparatus 100 is mainly applied to railway vehicles. The brake apparatus 100 brakes a wheel 1 by sandwiching brake discs 1a rotating together with the wheel 1. Specifically, the brake apparatus 100 brakes the rotation of the wheel 1 by frictional forces between the brake discs 1a and brake linings 2 by sandwiching the brake discs 1a from opposite sides by a pair of brake linings 2.

The brake discs 1a are formed on both sides of the wheel 1 and integrally rotate with the wheel 1. Instead of a configuration in which the brake discs 1a are integrally formed to the wheel 1, separate brake discs 1a configured to rotate together with the wheel 1 may be provided.

The brake linings 2 face the brake discs 1a with a predetermined interval set in advance therebetween (state shown in FIG. 1) when braking is not applied. The brake linings 2 move toward the brake discs 1a and are pressed into contact with the brake discs 1a in parallel during braking.

The brake lining 2 includes a back plate portion 2a supported on a lining holding portion 3 of the brake apparatus 100 and a friction member 2b configured to come into contact with the brake disc 1a during braking. The friction member 2b is composed of a plurality of segments and fixed to a surface of the back plate portion 2a. The brake lining 2 brakes the rotation of the wheel 1 by a frictional force generated by the contact of the friction member 2b and the brake disc 1a.

The lining holding portion 3 includes dovetail grooves (not shown) into which the back plate portions 2a of the brake linings 2 are to be inserted. Anchor blocks 4 to be fixed to the lining holding portion 3 by a pair of anchor bolts 5 are respectively provided on upper and lower end parts of the lining holding portion 3. The anchor blocks 4 fix end parts of the back plate portions 2a of the brake linings 2 in a longitudinal direction (vertical direction in FIG. 2). This causes the brake linings 2 inserted into the dovetail grooves to be held on the lining holding portion 3.

The brake apparatus 100 includes a brake main body 10, a pair of link arms 30 having supporting portions 32 between one end parts 31 and other end parts 33 rotatably supported on the brake main body 10, a first coupling member 35 coupled to the one end part 31 of one of the pair of link arms 30, a second coupling member 36 coupled to the one end part 31 of the other of the pair of link arms 30 to freely advance and retract with respect to the first coupling member 35, an actuator 20 configured to advance and retract a rod 21 as an output member, a lever 40 rotatably coupled to the rod 21 of the actuator 20 and configured to be rotated by advancing and retracting movements of the rod 21, and a booster unit 50 configured to advance and retract the second coupling member 36 with respect to the first coupling member 35 by boosting a force transmitted by the rotation of the lever 40.

The brake main body 10 is supported on a truck (not shown) when the brake apparatus 100 is applied to a railway vehicle. The brake main body 10 is supported on a vehicle body (not shown) when the brake apparatus 100 is applied to a vehicle other than railway vehicles.

The actuator 20 is a fluid pressure actuator configured to be operated by a pressure of compressed air as working fluid. Instead of the compressed air, liquid or other fluid such as hydraulic oil may be used as the working fluid. The actuator 20 is attached to one of the pair of link arms 30. The actuator 20 is provided in a region enclosed by the first coupling member 35, the second coupling member 36 and the pair of link arms 30.

The actuator 20 includes an actuator main body 20a, a diaphragm 20c as an elastic membrane configured to define a pressure chamber 20b, into and from which the compressed air is supplied and discharged, in the actuator main body 20a, a piston 20d coupled to the rod 21 and configured to advance and retract by the deformation of the diaphragm 20c and a return spring 20e as a biasing member configured to bias the piston 20d against the pressure of the compressed air in the pressure chamber 20b. The actuator 20 operates on the basis of a braking operation of a driver and advances and retracts the rod 21 with respect to the actuator main body 20a.

When the brake apparatus 100 is in a non-braking state, the compressed air is released from the pressure chamber 20b. Thus, the piston 20d is biased by a biasing force of the return spring 20e and the rod 21 enters the actuator main body 20a. On the other hand, when the compressed air is supplied into the pressure chamber 20b, a force by the pressure in the pressure chamber 20b overcomes the biasing force of the return spring 20e and the rod 21 retracts from the actuator main body 20a. In this way, the brake apparatus 100 enters a braking state.

Without limitation to this, the actuator 20 may be of another type such as a mechanical actuator configured to be operated by the rotation of an electric motor.

Figure 4:
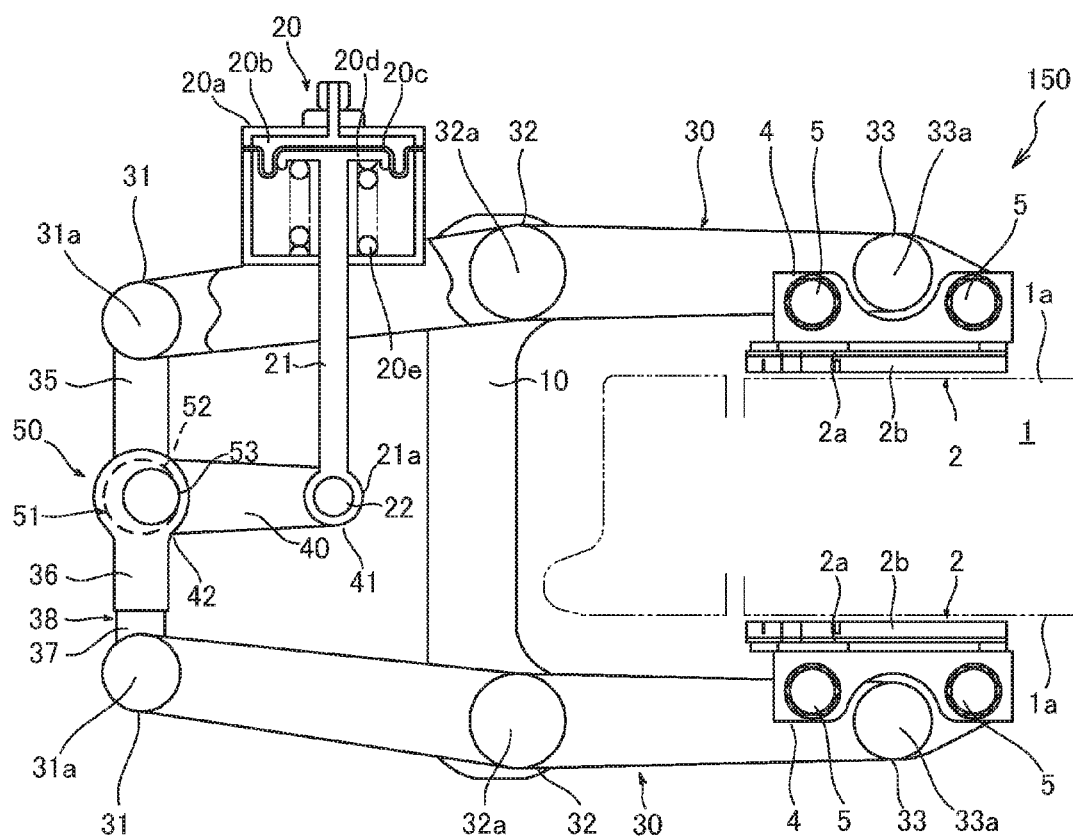
FIG. 4 is a plan view of a brake apparatus according to a modification of the first embodiment of the present invention.

Further, as in a brake apparatus 150 according to a modification shown in FIG. 4, the actuator 20 may be provided to project on a side of one link arm 30 opposite to a surface facing the other link arm 30. In this case, the actuator 20 is provided outside a region enclosed by the first coupling member 35, the second coupling member 36 and the pair of link arms 30. Thus, the transfer of friction heat generated by the sliding contact of the brake linings 2 with the brake discs 1a during braking to the actuator 20 is prevented. Further, since the actuator 20 is in contact with outside air, cooling performance of the actuator 20 can be improved.

The rod 21 includes a coupling shaft 22 rotatably coupling the lever 40 to a coupling portion 21a. The coupling shaft 22 is so arranged that a center axis thereof is parallel to the brake linings 2. The rod 21 can advance and retract with respect to the actuator main body 20a and swing in directions toward and away from the booster unit 50 (lateral directions in FIG. 1). Instead of this, the actuator 20 itself may be swingably supported on the link arm 30 via a swing mechanism (not shown).

Figure 2:
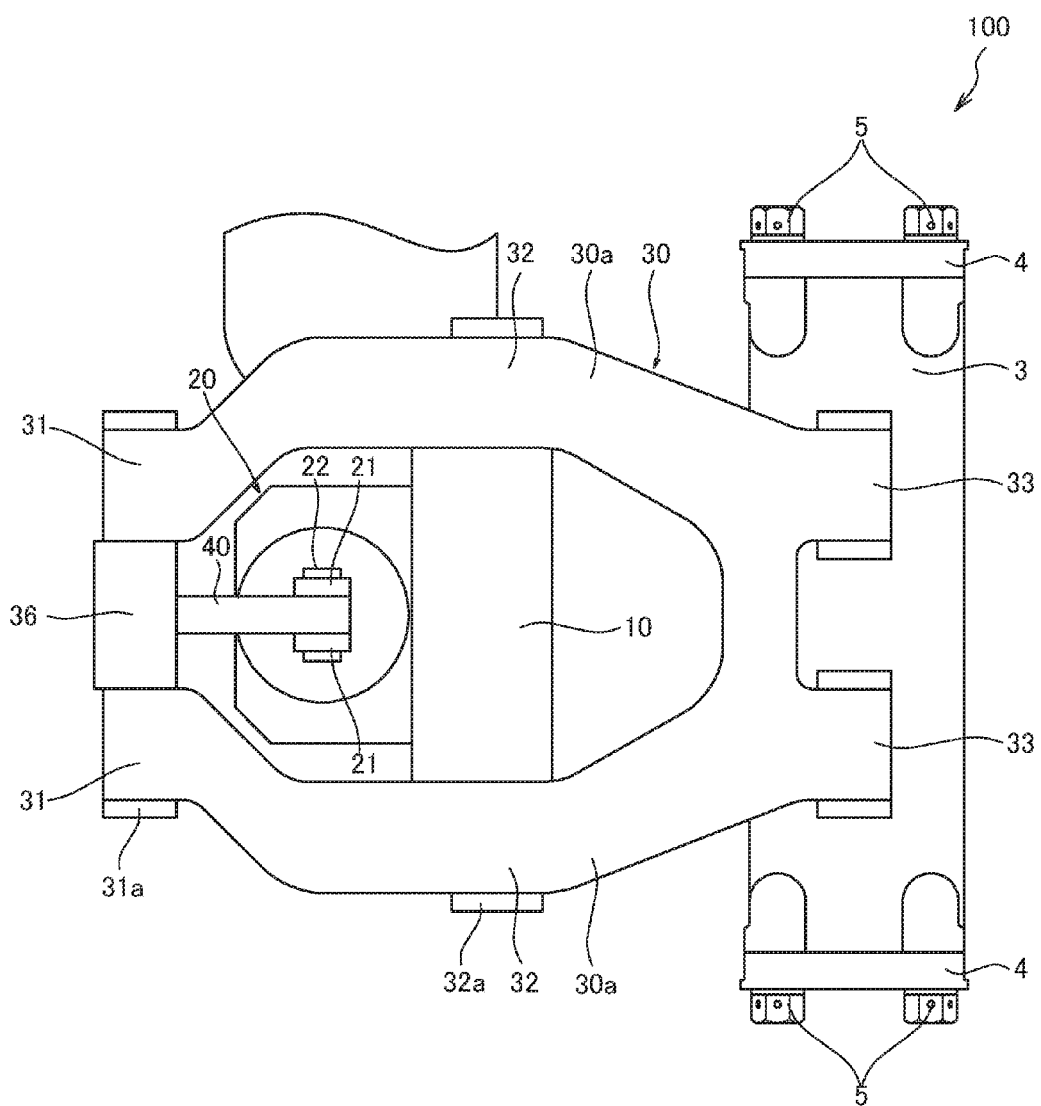
FIG. 2 is a front view in FIG. 1.

As shown in FIG. 1, the link arms 30 are respectively provided to face both surfaces of the brake discs 1a. The one end parts 31 of the pair of link arms 30 are coupled by the first and second coupling members 35, 36. The other end parts 33 of the link arms 30 swingably support the brake linings 2 configured to give frictional forces by sliding in contact with the brake discs 1a. As shown in FIG. 2, the link arm 30 is formed into a substantially U shape having a pair of arm portions 30a provided on upper and lower sides.

As shown in FIG. 1, a coupling shaft 31a coupling the first coupling member 35 and the link arm 30 by penetrating therethrough is provided on the one end part 31 of one link arm 30, and a coupling shaft 31a coupling the second coupling member 36 and the link arm 30 by penetrating therethrough is provided on the one end part 31 of the other link arm 30.

An arm shaft 32a coupling the link arm 30 and the brake main body 10 by penetrating therethrough is provided on the supporting portion 32 of the link arm 30. The link arm 30 is rotatably supported on the brake main body 10 by the arm shaft 32a. A circumferential tangential force acting on the brake lining 2 from the brake disc 1a during the braking of the brake apparatus 100 acts on the brake main body 10 via the arm shaft 32a from the supporting portion 32.

A lining shaft 33a coupling the link arm 30 and the lining holding portion 3 by penetrating therethrough is provided on the other end part 33 of the link arm 30. The lining holding portion 3 is rotatably supported on the link arm 30 by the lining shaft 33a. In this way, the brake lining 2 is made swingable relative to the link arm 30 and can constantly come into contact with the brake disc 1a in parallel during braking.

Figure 3:
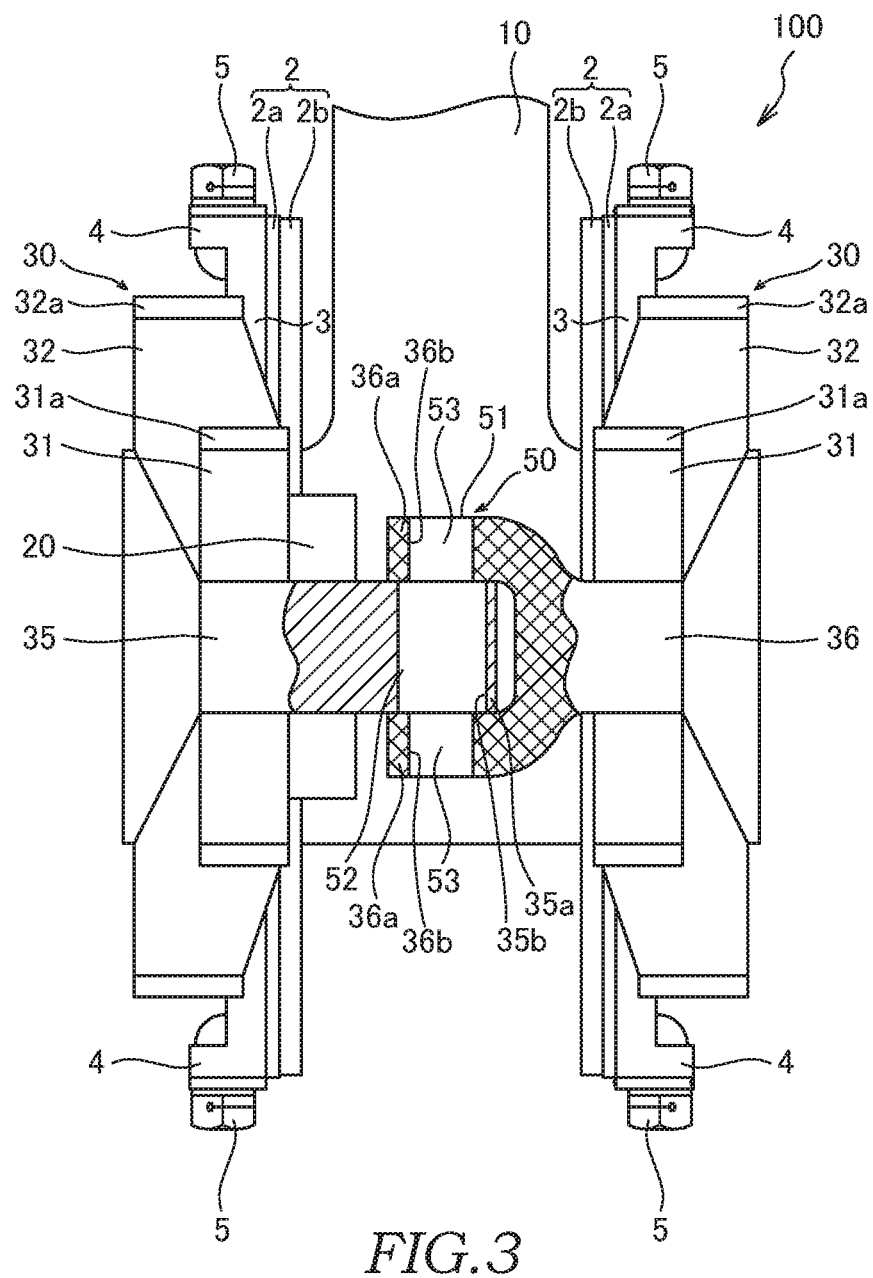
FIG. 3 is a left side view in FIG. 2.

As shown in FIG. 3, the first coupling member 35 includes a tip portion 35a coupled to the second coupling member 36 via the booster unit 50 and a through hole 35b formed on the tip portion 35a and penetrating through the tip portion 35a in a direction parallel to the coupling shaft 31a. The first coupling member 35 is rotatably coupled to one link arm 30 with the coupling shaft 31a as a rotary shaft. A rotary portion 52 of a later-described eccentric cam 51 of the booster unit 50 is inserted through the through hole 35b.

The second coupling member 36 includes a pair of tip portions 36a coupled to the first coupling member 35 via the booster unit 50 and through holes 36b respectively formed on the pair of tip portions 36a and penetrating through the tip portions 36a in a direction parallel to the coupling shaft 31a. The second coupling member 36 is rotatably coupled to the other link arm 30 with the coupling shaft 31a as a rotary shaft. Eccentric portions 53 of the later-described eccentric cam 51 of the booster unit 50 are inserted through the through holes 36b.

The pair of tip portions 36a are provided at opposite axial ends of the tip portion 35a of the first coupling member 35. The pair of through holes 36b are coaxially formed. The pair of through holes 36b are eccentrically formed at a distance L2 (see FIG. 1) from the through hole 35b of the first coupling member 35. It should be noted that the second coupling member 36 may be rotatably coupled to the one link arm 30 and the first coupling member 35 may be rotatably coupled to the other link arm 30.

As shown in FIG. 1, the lever 40 transmits a force by advancing and retracting movements of the rod 21 of the actuator 20 to the booster unit 50. One end part 41 of the lever 40 is rotatably coupled to the coupling shaft 22 of the rod 21. Another end part 42 of the lever 40 is unrotatably coupled to the later-described rotary portion 52 of the booster unit 50. The lever 40 rotates between the coupling shaft 22 and the rotary portion 52 when the rod 21 advances and retracts with respect to the actuator main body 20a.

As shown in FIGS. 1 and 3, the booster unit 50 includes the eccentric cam 51 configured to advance and retract the second coupling member 36 with respect to the first coupling member 35 by being rotated about an axis of rotation A1 by the rotation of the lever 40.

The eccentric cam 51 is provided on a part coupling the first and second coupling members 35, 36. The eccentric cam 51 includes the rotary portion 52 coupled to the first coupling member 35 rotatably about the axis of rotation A1 and the eccentric portions 53 having a center axis A2 at a position offset from the axis of rotation A1 and configured to rotate along arcuate paths about the axis of rotation A1 by the rotation of the lever 40.

The rotary portion 52 is formed to have substantially the same diameter as the through hole 35*b* of the first coupling member 35. A center axis of the rotary portion 52 is the axis of rotation A1 of the eccentric cam 51. The lever 40 is relatively unrotatably coupled to the rotary portion 52. Thus, when the rod 21 advances and retracts with respect to the actuator main body 20*a* to rotate the lever 40, the eccentric portions 53 rotate along the arcuate paths centered on the axis of rotation A1.

The eccentric portions 53 are formed to have a smaller diameter than the rotary portion 52. The eccentric portions 53 are formed to have substantially the same diameter as the through holes 36*b* of the second coupling member 36. The eccentric portions 53 are respectively provided at opposite axial side of the rotary portion 52.

As just described, the eccentric cam 51 includes the rotary portion 52 in a center and the eccentric portions 53 having a smaller diameter than the rotary portion 52 on opposite ends thereof. Thus, the eccentric cam 51 is easily processed since a diameter thereof becomes smaller from the center toward opposite end parts. Further, since the first and second coupling members 35, 36 can be successively assembled with the eccentric cam 51, assemblability is good.

The brake apparatus 100 further includes an adjuster 38 configured to extend the second coupling member 36 according to an amount of abrasion of the brake linings 2. Thus, when the brake linings 2 are abraded, the second coupling member 36 extends by that much. Therefore, the predetermined intervals between the brake linings 2 and the brake discs 1*a* can be maintained even if the brake linings 2 are abraded.

The adjuster 38 is provided on the one coupled to the link arm 30 having the actuator 20 not attached thereto out of the first and second coupling members 35, 36. Thus, in the case of attaching the actuator 20 to the link arm 30 having the second coupling member 36 coupled thereto, the adjuster 38 is provided on the first coupling member 35. The adjuster 38 extends the second coupling member 36 by extending an adjustment rod 37. When the brake apparatus 100 enters a braking state and the brake linings 2 are abraded, an adjustment screw (not shown) provided in the second coupling member 36 rotates and the adjuster 38 extends the adjustment rod 37.

As just described, since the adjuster 38 is provided on the second coupling member 36, a positional relationship of the actuator 20 and the booster unit 50 does not change even if the brake linings 2 are abraded and the second coupling member 36 extends. Thus, even if the brake linings 2 are abraded, it is possible not to change operation characteristics of the actuator 20.

Next, functions of the brake apparatus 100 are described.

The brake apparatus 100 enters the braking state from the non-braking state (state shown in FIGS. 1 to 3) when the actuator 20 operates on the basis of a braking operation of the driver.

When the rod 21 is retracted from the actuator main body 20*a* by the pressure of the compressed air supplied to the pressure chamber 20*b* of the actuator 20, the lever 40 rotates by being pushed by the coupling shaft 22. A force of the actuator 20 for retracting the rod 21 is transmitted to the rotary portion 52 of the eccentric cam 51 via the lever 40.

The eccentric cam 51 is rotated in one direction (clockwise direction in FIG. 1) by the force transmitted via the lever 40. At this time, the eccentric portions 53 rotate along the arcuate paths about the axis of rotation A1. Since this causes the second coupling member 36 to move integrally with the eccentric portions 53 in a direction to separate from the first coupling member 35, the one end parts 31 of the pair of link arms 30 move in directions to separate from each other.

Since the link arms 30 are rotatably supported on the brake main body 10 by the supporting portions 32, if the one end parts 31 move in the directions to separate from each other, the other end parts 33 move in directions to approach each other. Thus, the brake linings 2 move toward the brake discs 1*a* and are pressed into contact with the brake discs 1*a* in parallel to brake the rotation of the wheel 1.

At this time, the eccentric cam 51 transmits a force transmitted from the rod 21 via the lever 40 to the link arms 30 by boosting the force by a factor of L1/L2 by a lever ratio of a distance L1 between a center axis A3 of the coupling shaft 22 and the axis of rotation A1 and a distance L2 between the axis of rotation A1 and the center axis A2 of the eccentric portions 53. Thus, a large braking force can be obtained without providing a large-size actuator. Therefore, the brake apparatus 100 can be reduced in size and weight.

Further, the supporting portion 32 of the link arm 30 between the one and other end parts 31, 33 is rotatably supported on the brake main body 10. The eccentric cam 51 configured to rotate the link arms 30 by boosting the force transmitted to the rod 21 by the rotation of the lever 40 is provided on the part coupling the first and second coupling members 35, 36. Thus, circumferential tangential forces acting on the brake linings 2 from the brake discs 1*a* during the braking of the brake apparatus 100 act on the arm shafts 32*a* of the supporting portions 32 and do not act on the eccentric cam 51. Thus, frictional resistance when the eccentric cam 51 rotates does not become large, wherefore mechanical efficiency during the braking of the brake apparatus 100 can be improved.

The force transmitted to the one end part 31 of the link arm 30 from the eccentric cam 51 is boosted by a factor of L3/L4 by a lever ratio of a distance L3 between the one end part 31 and the supporting portion 32 and a distance L4 between the supporting portion 32 and the other end part 33. Since the distance L4 is longer than the distance L3 in the brake apparatus 100, a force for pressing the brake lining 2 against the brake disc 1*a* is smaller than the force transmitted to the one end part 31 of the link arm 30 from the eccentric cam 51.

However, in the brake apparatus 100, the force transmitted from the rod 21 of the actuator 20 via the lever 40 by the eccentric cam 51 is boosted by a large factor. Thus, a sufficiently large braking force can be obtained even if the link arms 30 are shortened to reduce the distance L3 for a size and weight reduction of the brake apparatus 100.

It should be noted that, in the brake apparatus 100, a degree of design freedom of the positions of the arm shafts 32*a* of the supporting portions 32 is increased by providing the eccentric cam 51 on the part coupling the first and second coupling members 35, 36. Thus, it is also possible to arrange the arm shafts 32*a* at positions facing side surfaces of the wheel 1. Therefore, the distance L3 can be made longer than the distance L4 and the brake linings 2 can be pressed against the brake discs 1a by further boosting the force boosted by the eccentric cam 51.

The brake apparatus 100 enters the non-braking state (state shown in FIGS. 1 to 3) from the braking state when the actuator 20 operates in a direction opposite to that during braking based on a brake releasing operation of the driver.

When the compressed air in the pressure chamber 20b of the actuator 20 is discharged and the rod 21 is caused to enter the actuator main body 20a by the biasing force of the return spring 20e, the lever 40 rotates by being pulled by the coupling shaft 22. A force of the actuator 20 for causing the rod 21 to enter is transmitted to the rotary portion 52 of the eccentric cam 51 via the lever 40.

The eccentric cam 51 is rotated in the other direction (counterclockwise direction in FIG. 1) by the force transmitted via the lever 40. At this time, the eccentric portions 53 rotate along the arcuate paths centered on the axis of rotation A1. This causes the one end parts 31 of the pair of link arms 30 to move in directions to approach each other. Thus, the other end parts 33 of the pair of link arms 30 move in directions to separate from each other. In this way, the brake linings 2 are separated from the brake discs 1a to release the braking of the wheel 1.

According to the above first embodiment, the following effects are exhibited.

The link arms 30 have the supporting portions 32 between the one end parts 31 and the other end parts 33 rotatably supported on the brake main body 10. The eccentric cam 51 for rotating the link arms 30 by boosting a force transmitted to the rod 21 by the rotation of the lever 40 is provided on the part coupling the first and second coupling members 35, 36. Thus, circumferential tangential forces acting on the brake linings 2 from the brake discs 1a during the braking of the brake apparatus 100 act on the arm shafts 32a of the supporting portions 32 and do not act on the eccentric cam 51. Accordingly, frictional resistance when the eccentric cam 51 rotates does not become large, wherefore mechanical efficiency during the braking of the brake apparatus 100 can be improved.

Second Embodiment

Figure 5:
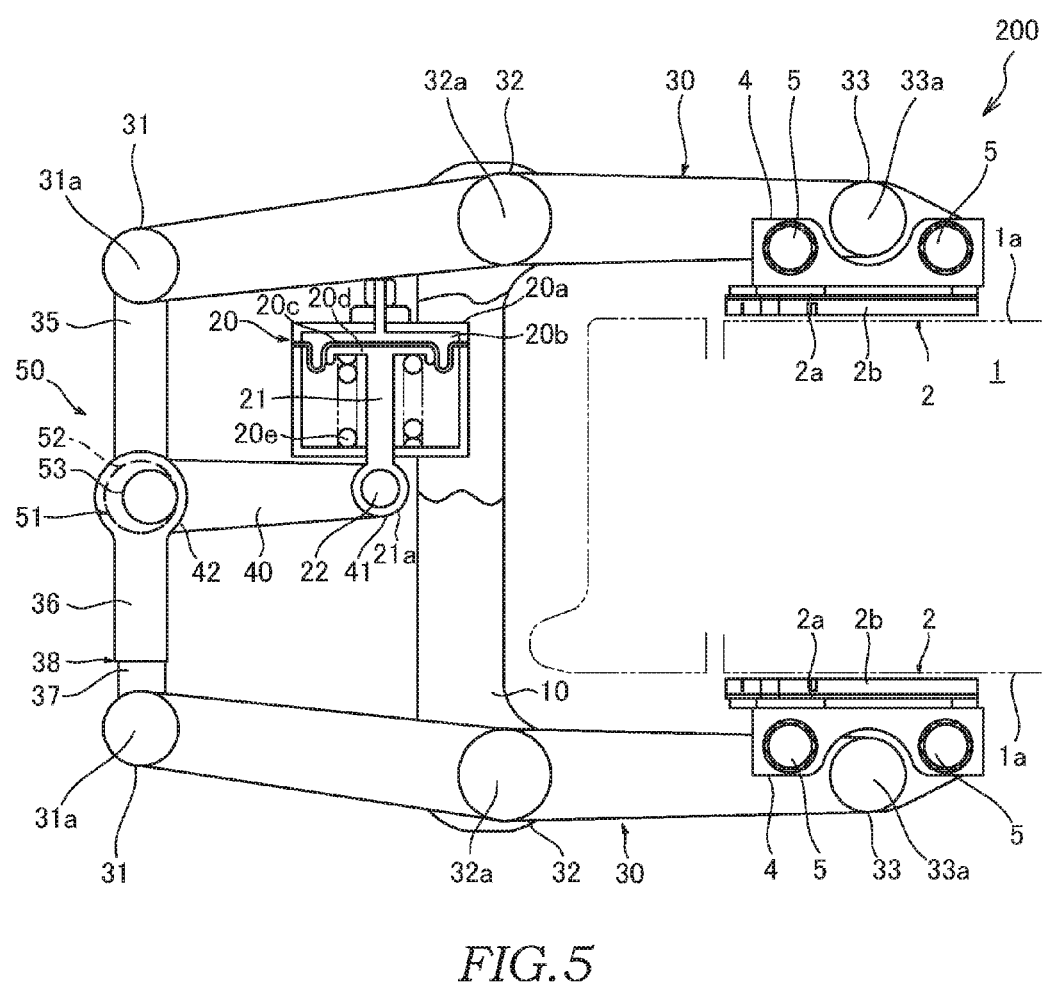

Next, the configuration of a brake apparatus 200 according to a second embodiment of the present invention is described with reference to FIG. 5. It should be noted that components similar to those of the first embodiment described above are denoted by the same reference signs and repeated description is omitted as appropriate in each of the following embodiments.

The second embodiment differs from the first embodiment in that an actuator 20 is provided on a brake main body 10.

The actuator 20 is provided between a pair of link arms 30 in a brake main body 10. Also in this case, circumferential tangential forces acting on brake linings 2 from brake discs 1a during the braking of a brake apparatus 200 act on arm shafts 32a of supporting portions 32 and do not act on an eccentric cam 51 as in the above first embodiment. Accordingly, frictional resistance when the eccentric cam 51 rotates does not become large, wherefore mechanical efficiency during the braking of the brake apparatus 200 can be improved.

Further, since the actuator 20 is arranged between the pair of link arms 30 according to the second embodiment, a lateral weight balance of the brake apparatus 200 can be improved. Further, since the actuator 20 is provided on the brake main body 10, piping for supplying and discharging compressed air to and from the actuator 20 is easily arranged.

Third Embodiment

Figure 6:
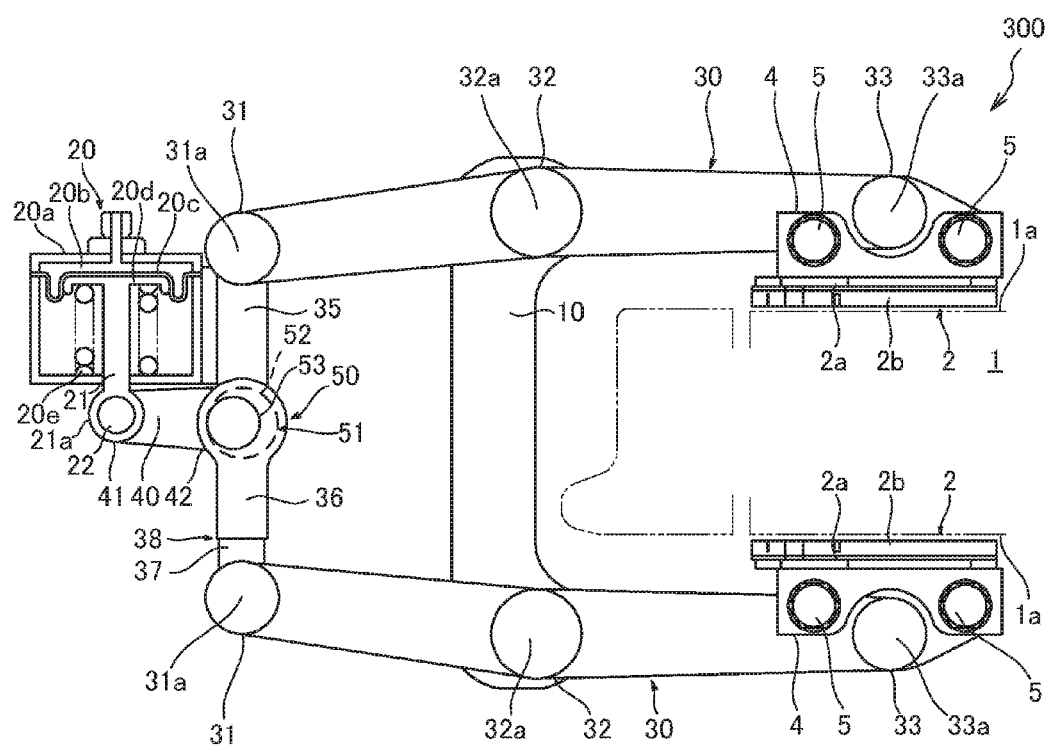
FIG. 6 is a plan view of a brake apparatus according to a third embodiment of the present invention.

Next, the configuration of a brake apparatus 300 according to a third embodiment of the present invention is described with reference to FIG. 6.

The third embodiment differs from the first and second embodiments in that an actuator 20 is provided on a first coupling member 35.

The actuator 20 is provided at a position distant from supporting portions 32 than one end parts 31 of link arms 30. That is, the actuator 20 is provided to face a brake main body 10 across the first coupling member 35.

Also in this case, circumferential tangential forces acting on brake linings 2 from brake discs 1a during the braking of a brake apparatus 300 act on arm shafts 32a of the supporting portions 32 and do not act on an eccentric cam 51 as in the above first and second embodiments. Accordingly, frictional resistance when the eccentric cam 51 rotates does not become large, wherefore mechanical efficiency during the braking of the brake apparatus 300 can be improved.

Further, since the actuator 20 is provided outside a region enclosed by the first coupling member 35, a second coupling member 36 and a pair of link arms 30 according to the third embodiment, a degree of freedom in designing the link arms 30 is improved. Thus, the link arms 30 can be shortened, wherefore the brake apparatus 300 can be reduced in size and weight.

It should be noted that the actuator 20 has only to be attached to the first coupling member 35 or the second coupling member 36. Thus, the actuator 20 may be provided inside the region enclosed by the first coupling member 35, the second coupling member 36 and the pair of link arms 30. In the case of attaching the actuator 20 to the second coupling member 36, an adjuster 38 is provided on the first coupling member 35.

The configurations, functions and effects of the embodiments of the present invention are summarized.

In the first to third embodiments, the brake apparatus 100, 150, 200 or 300 for braking by sandwiching the brake discs 1a rotating together with the wheel 1 includes the brake main body 10 to be supported on the vehicle body or the truck, the pair of link arms 30 having the supporting portions 32 between the one end parts 31 and the other end parts 33 rotatably supported on the brake main body 10, respectively facing the both sides of the brake discs 1a and configured such that the other end parts 33 support the brake linings 2 for giving a frictional force by sliding in contact with the brake discs 1a, the first coupling member 35 coupled to the one end part 31 of one of the pair of link arms 30, the second coupling member 36 coupled to the one end part 31 of the other of the pair of link arms 30 to freely advance and retract with respect to the first coupling member 35, the actuator 20 configured to advance and retract the rod 21, the lever 40 rotatably coupled to the rod 21 of the actuator 20 and configured to be rotated by advancing and retracting movements of the rod 21, and the booster unit 50 configured to advance and retract the second coupling member 36 with respect to the first coupling member 35 by boosting a force transmitted by the rotation of the lever 40.

In this configuration, the link arms 30 have the supporting portions 32 between the one end parts 31 and the other end parts 33 rotatably supported on the brake main body 10. The booster unit 50 configured to boost the force transmitted to the rod 21 by the rotation of the lever 40 is provided to advance and retract the second coupling member 36 with respect to the first coupling member 35. Thus, circumferential tangential forces acting on the brake linings 2 from the brake discs 1a during the braking of the brake apparatus 100 act on the supporting portions 32 and do not act on the booster unit 50. Therefore, mechanical efficiency during the braking of the brake apparatus 100 can be improved.

Further, in the first to third embodiments, the booster unit 50 includes the eccentric cam 51 configured to advance and retract the second coupling member 36 with respect to the first coupling member 35 by being rotated about the axis of rotation A1 by the rotation of the lever 40.

Further, in the first to third embodiments, the eccentric cam 51 is coupled to one of the first and second coupling members 35, 36 and includes the rotary portion 52 configured to rotate about the axis of rotation A1 and the eccentric portions 53 coupled to the other of the first and second coupling members 35, 36, having the center axis A2 at the position offset from the axis of rotation A1 and configured to be rotated along the arcuate paths about the axis of rotation A1 by the rotation of the lever 40.

According to these configurations, the eccentric cam 51 transmits a force transmitted from the rod 21 via the lever 40 to the link arms 30 by boosting the force by the factor of L1/L2 by the lever ratio of the distance L1 between the opposite end parts of the lever 40 and the distance L2 from the axis of rotation A1 to the center axis A2 of the eccentric portions 53. Thus, a large braking force can be obtained without providing a large-size actuator. Therefore, the brake apparatus 100 can be reduced in size and weight.

Further, in the first embodiment, the actuator 20 is attached to one of the pair of link arms 30.

Further, in the first embodiment, the actuator 20 is provided to project on the side of the one link arm 30 opposite to the surface facing the other link arm 30.

In these configurations, the actuator 20 is provided outside the region enclosed by the first coupling member 35, the second coupling member 36 and the pair of link arms 30. Thus, the transfer of friction heat generated by the sliding contact of the brake linings 2 with the brake discs 1a during braking to the actuator 20 is prevented. Further, since the actuator 20 is in contact with outside air, cooling performance of the actuator 20 can be improved.

Further, in the first to third embodiments, the adjuster 38 is further provided which extends the first or second coupling member 35, 36 according to the amount of abrasion of the brake linings 2.

In this configuration, when the brake linings 2 are abraded, the first or second coupling member 35, 36 extends by that much. Thus, the predetermined intervals between the brake linings 2 and the brake discs 1a can be maintained even if the brake linings 2 are abraded.

Further, in the first embodiment, the adjuster 38 is provided on the one coupled to the link arm 30 having the actuator 20 not attached thereto out of the first and second coupling members 35, 36.

In this configuration, since the adjuster 38 is provided on the one coupled to the link arm 30 having the actuator 20 not attached thereto out of the first and second coupling members 35, 36, even if the brake linings 2 are abraded and the first coupling member 35 extends, the positional relationship between the actuator 20 and the booster unit 50 does not change. Thus, even if the brake linings 2 are abraded, it is possible not to change the operation characteristics of the actuator 20.

Further, in the second embodiment, the actuator 20 is attached to the brake main body 10.

Further, in the third embodiment, the actuator 20 is attached to the first or second coupling member 35, 36.

In these configurations, mechanical efficiency during the braking of the brake apparatus 200, 300 can be improved as in the first embodiment even if the attached position of the actuator 20 is changed.

Embodiments of this invention were described above, but the above embodiments are merely examples of applications of this invention, and the technical scope of this invention is not limited to the specific constitutions of the above embodiments.

For example, the rod 21 of the actuator 20 and the lever 40 may be covered by a cover member (not shown) attached to the first coupling member 35. This can protect the rod 21 and the lever 40 configured to operate during the operation of the brake apparatus 100, 150, 200 and 300.

It should be noted that the above embodiments can be combined as appropriate.

This application claims priority based on Japanese Patent Application No. 2014-166035 filed with the Japan Patent Office on Aug. 18, 2014, the entire contents of which are incorporated into this specification.

The invention claimed is:

1. A brake apparatus for braking by sandwiching brake discs rotating together with a wheel, comprising:
 a brake main body supported on a vehicle body or a truck;
 a pair of link arms each having a supporting portion between one end part and another end part rotatably supported on the brake main body, the pair of link arms being respectively provided to face surfaces of the brake discs and configured such that the other end part supports brake linings for giving a frictional force by sliding in contact with the brake discs;
 a first coupling member coupled to the one end part of one link arm of the pair of link arms;
 a second coupling member coupled to the one end part of another link arm of the pair of link arms to freely advance and retract with respect to the first coupling member;
 an actuator configured to advance and retract an output member;
 a lever rotatably coupled to the output member of the actuator and configured to perform rotation by advancing and retracting movements of the output member; and
 a booster unit configured to advance and retract the second coupling member with respect to the first coupling member by boosting a force transmitted by the rotation of the lever,
 wherein the booster unit includes an eccentric cam configured to advance and retract the second coupling member with respect to the first coupling member by being rotated about an axis of rotation by the rotation of the lever, and
 wherein the eccentric cam includes:
 a rotary portion coupled to one of the first coupling member and the second coupling member, coupled with the lever relatively unrotatably, and configured to rotate about the axis of rotation when the lever rotates.

2. The brake apparatus according to claim 1, wherein the eccentric cam includes:
 an eccentric portion coupled to another of the first coupling member and the second coupling member, having a center axis at a position offset from the axis of rotation and configured to be rotated along an arcuate path about the axis of rotation by the rotation of the lever.

3. The brake apparatus according to claim 1, wherein the actuator is attached to the one link arm or the other link arm of the pair of link arms.

4. The brake apparatus according to claim 3, wherein the actuator is provided to project on a side of the one link arm opposite to a surface facing the other link arm.

5. The brake apparatus according to claim 4, further comprising an adjuster configured to extend the first coupling member or the second coupling member according to an amount of abrasion of the brake linings.

6. The brake apparatus according to claim 5, wherein the adjuster is provided on the second coupling member if the actuator is attached to the one link arm, and is provided on the first coupling member if the actuator is attached to the other link arm.

7. The brake apparatus according to claim 1, wherein the actuator is attached to the brake main body.

8. The brake apparatus according to claim 1, wherein the actuator is attached to the first coupling member or the second coupling member.

\* \* \* \* \*